(12) United States Patent
Tisserand et al.

(10) Patent No.: US 8,164,867 B2
(45) Date of Patent: Apr. 24, 2012

(54) METHOD FOR PROTECTION OF ENERGY STORAGE SOURCE, AND IN PARTICULAR MOTOR VEHICLE BATTERY

(75) Inventors: Pierre Tisserand, Limeil Brevannes (FR); Pierre Chassard, Creteil (FR); Vincent Gendron, Saint Maur des Fossés (FR)

(73) Assignee: Valeo Equipements Electriques Moteur, Creteil (FR)

( * ) Notice: Subject to any disclaimer, the term of this patent is extended or adjusted under 35 U.S.C. 154(b) by 196 days.

(21) Appl. No.: 12/504,835

(22) Filed: Jul. 17, 2009

(65) Prior Publication Data
US 2010/0053825 A1 Mar. 4, 2010

(30) Foreign Application Priority Data
Aug. 26, 2008 (FR) ...................................... 08 55734

(51) Int. Cl.
*H02H 7/06* (2006.01)
(52) U.S. Cl. ........................................................ 361/21
(58) Field of Classification Search ...................... 361/21
See application file for complete search history.

(56) References Cited

U.S. PATENT DOCUMENTS

| 4,315,204 | A * | 2/1982 | Sievers et al. | 322/28 |
| 6,064,186 | A * | 5/2000 | Pierret et al. | 322/28 |
| 2003/0001661 | A1* | 1/2003 | Kim et al. | 327/540 |
| 2006/0276937 | A1* | 12/2006 | Yamashita | 700/291 |

FOREIGN PATENT DOCUMENTS

| DE | 44 06 064 A1 | 8/1994 |
| EP | 0 849 855 A1 | 6/1998 |
| WO | WO 98/20594 | 5/1998 |

\* cited by examiner

*Primary Examiner* — Rexford N Barnie
*Assistant Examiner* — Ann Hoang
(74) *Attorney, Agent, or Firm* — Berenato & White, LLC

(57) ABSTRACT

A method for protection of an energy storage source (2), in particular a battery of a motor vehicle, against possible overloading caused by prolonged application of an electric voltage to the energy storage source, this voltage being generated at least partially by a rotary electric machine (1) such as an alternator or an alternator-starter, the method comprising the following steps:
 permitting measurement of a charge level of the energy storage source, this charge level being represented for example by a voltage measured at the terminals of the energy storage source or a PWM signal, while the rotary electric machine is functioning in a predetermined functioning mode, and electric excitation is being applied to it;
 comparing a value (SENSE) of this measurement with a reference value (Max_SP);
 if the value measured for the energy storage source is greater than the reference value, interrupting the excitation applied to the rotary electric machine.

9 Claims, 1 Drawing Sheet

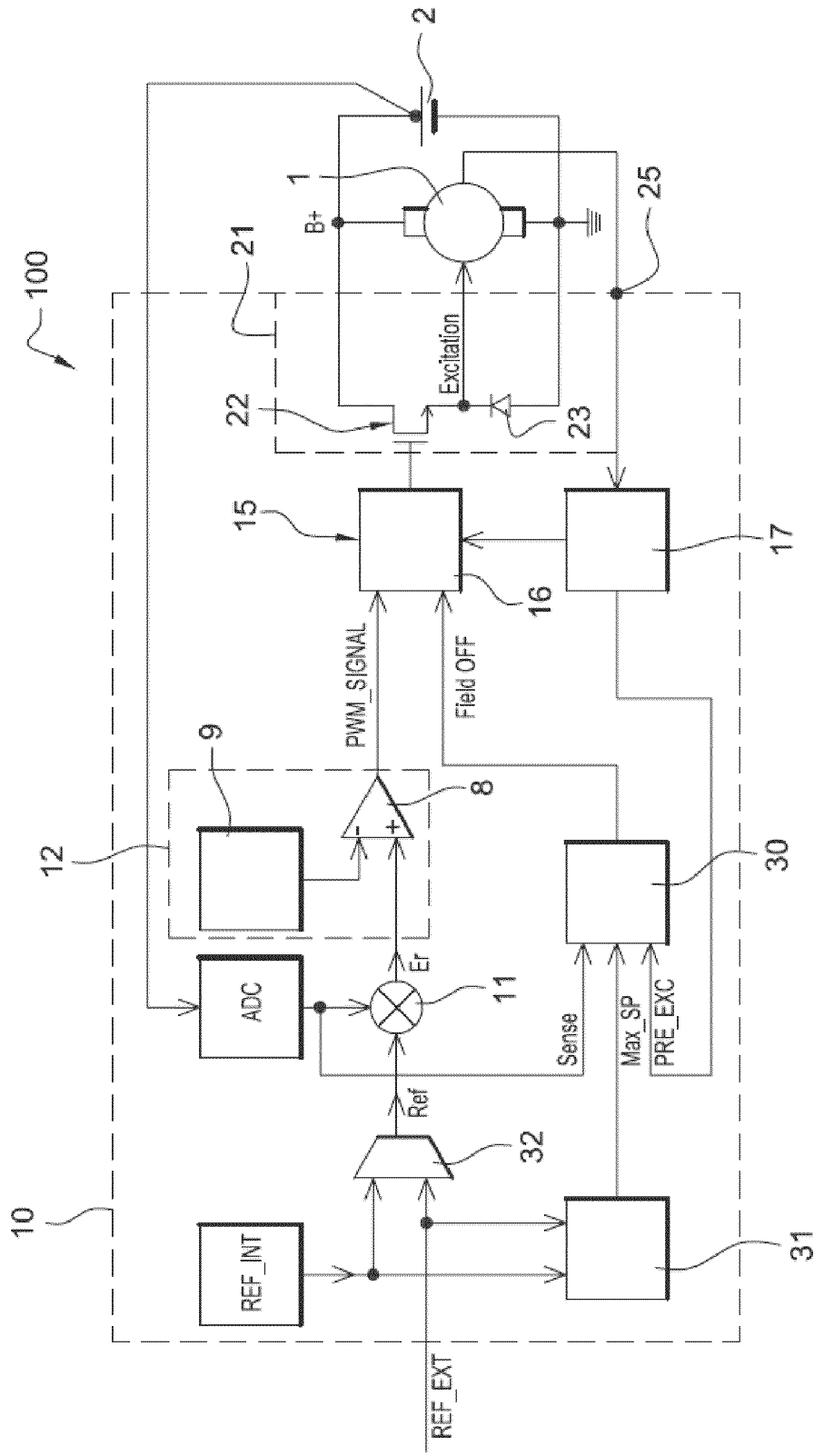

METHOD FOR PROTECTION OF ENERGY STORAGE SOURCE, AND IN PARTICULAR MOTOR VEHICLE BATTERY

This application foreign priority rights and claims benefit under 35 U.S.C. 119 based on French patent application no 08/55734, which is hereby incorporated by reference in its entirety.

BACKGROUND OF THE INVENTION

1. Field of the Invention

The invention relates in particular to a method for protection of an energy storage source, in particular a motor vehicle battery.

2. Description of Related Art

Patent EP 920 722 B1 describes a system for regulation of a generator on a motor vehicle.

It is known to impose on a rotary electric machine such as an alternator a functioning mode which is selected from amongst a plurality of predetermined modes.

These modes are imposed by a states machine, and correspond for example to the following modes:

Stoppage mode, known as the STAND_BY mode, in which the excitation of the rotor is maintained at 0% in cyclical ratio terms;

Timing mode, known as the TIMER mode, in which the excitation is cut off for a predetermined time, for example for 5 seconds during starting;

Pre-excitation mode of the rotor, known as PRE_EXC, during which the cyclical ratio is maintained at approximately 12.5% for example (an object of this mode is to magnetize the rotor in order to be able to measure the phase frequency before the normal regulation mode, as soon as rotation begins);

Progressive response mode, known as LRC mode, during which the cyclical ratio varies between 0 and 100%;

Normal regulation mode, known as NORMAL mode, during which the cyclical ratio varies according to the battery charge in particular;

Phase regulation mode.

The alternator is generally connected to a voltage regulator and to a battery, in a known manner.

One or a plurality of sensors for the speed of rotation of the rotor of the alternator can be provided, and one or a plurality of phase screws (this screw permitting a mechanical connection and an electrical connection between the phases of the stator and the regulator) enable the voltage regulator to obtain information which is representative of this speed of rotation.

This can make it possible to start generating output current of the alternator above a certain speed, for example 800 rpm.

In the event of accidental disconnection of the phase screw on the vehicle, the regulator may be deprived of the possibility of obtaining information on the speed of rotation of the alternator, and this regulator, when it is functioning in pre-excitation mode PRE_EXC, may remain blocked functioning in this pre-excitation mode.

This situation can become dangerous because of possible overloading of the battery, giving rise to excess voltage on the network on board the vehicle, in the case when the alternator functions for a prolonged period of time in the pre-excitation mode (in particular despite an alert given for example by a lamp, with the driver of the vehicle ignoring this alert).

The invention is intended in particular to eliminate this type of problem.

SUMMARY OF THE INVENTION

The object of the invention is thus a method for protection of an energy storage source, in particular a battery of a motor vehicle, against possible overloading caused by prolonged application of an electric voltage to the energy storage source, this voltage being generated at least partially by a rotary electric machine such as an alternator or an alternator-starter, the method comprising the following steps:

permitting measurement of a charge level of the energy storage source, this charge level being represented for example by a voltage measured at the terminals of the energy storage source or a PWM signal, whilst the rotary electric machine is functioning in a predetermined functioning mode, and electric excitation is being applied to it;

comparing a value of this measurement with a reference value;

if the value measured for the energy storage source is greater than the reference value, interrupting the excitation applied to the rotary electric machine.

The invention thus makes it possible to monitor the voltage at the terminals of the energy storage source and to protect it against a possible overload, in particular in the pre-excitation functioning mode.

During said predetermined functioning mode, the excitation which is applied to the rotary electric machine is substantially constant, if this is required.

Preferably, the predetermined functioning mode corresponds to a pre-excitation mode of the rotary electric machine.

In an example of implementation of the invention, the excitation which is applied to the rotary electric machine during this functioning mode corresponds to a cyclical ratio which is selected from between 5% and 20%, and in particular is close to 12.5%.

Advantageously, the reference value is selected as the larger one of two command values.

One of the commands is obtained in particular from the engine control of the vehicle.

The other one of the commands is in particular generated internally in the regulator only if the engine control does not send any command.

The electrical excitation which is applied to the rotary electric machine is advantageously supplied by a regulator, and the first one of the two command values is supplied externally to the regulator, in particular by a system to control the vehicle engine, and is transmitted to this regulator, and the second one of these command values is generated internally by the regulator.

The object of the invention is also a regulator for a rotary electric machine such as an alternator or an alternator-starter, this regulator comprising:

a block such as a logic block which can receive at least one item of information which is representative of a charge level of an energy storage source, a reference value and an item of information which is representative of a functioning mode of the rotary electric machine which is selected from amongst a plurality of functioning modes, and is designed to make possible a comparison of the information which is representative of a charge level of the energy storage source, with the reference value, at least when the rotary electric machine is functioning in a predetermined mode detected by the block;

a field controller which is designed to receive an order from the logic block in order to give rise to interruption of excitation applied to the rotary electric machine, when, further to said comparison, the block detects an excessive charge level of the energy storage source during this functioning mode.

The regulator preferably comprises a maximum command detection block, in particular of the digital type, which is designed to generate said reference value selected as the maximum for an internal command and external command detected by this detection block.

The regulator is preferably designed to receive and process at least one item of information which is representative of the speed of rotation of the rotor of the rotary electric machine.

In one example of implementation of the invention, the regulator is designed to impose on the rotary electric machine, from amongst a plurality of functioning modes, a pre-excitation functioning mode, during which electrical excitation, corresponding to a predetermined cyclical ratio, which in particular is maintained constant during this functioning mode, and for example is substantially equal to 12.5%, is applied to the rotary electric machine.

If applicable, the regulator is designed such as, in non-defective functioning, to permit the receipt of the information which is representative of the speed of rotation of the rotor of the rotary electric machine, during the pre-excitation functioning mode of the rotary electric machine.

BRIEF DESCRIPTION OF THE DRAWINGS

The invention will be able to be better understood by reading the following detailed description of a non-limiting example of implementation of the invention, and by examining the single appended FIGURE.

FIG. 1 shows an assembly 100 for a motor vehicle, comprising a polyphase rotary electric machine 1, which in the example considered consists of an alternator.

DETAILED DESCRIPTION OF THE PREFERRED EMBODIMENT

This alternator 1 can be rotated by an internal combustion engine of the motor vehicle, in order to produce electric energy.

In a known manner, the alternator 1 comprises firstly a stator, comprising windings which in the example described form three phases, and secondly a rotor comprising an excitation winding.

As a variant, the machine 1 can be an alternator-starter.

The alternator 1 is connected to a battery 2 which is on board the vehicle.

The assembly 100 additionally comprises a regulator 10 for the alternator 1, which regulator 10 can supply an electric current, the intensity of which varies according to excitation pulses or signals.

The regulator 10 comprises a differential amplifier 11, which is designed to supply error information Er which is representative of the difference between a command Ref and a voltage value, converted by the block ADC from analogue to digital, at a terminal B+ of the alternator 1 which is connected to the battery 2.

The regulator 10 additionally comprises an excitation signal generator 12 which is designed to supply excitation signals PWM_SIGNAL, the cyclical ratio of which varies in particular according to the error information Er supplied by the differential amplifier 11.

In the example described, the generator 12 is of the pulse width modulation (PWM) type, which can comprise a comparator 8 and a sawtooth signal generator 9.

The regulator 10 comprises a command module 15 which can command the electric excitation which is applied to the rotary electric machine 1, according to a functioning state selected from amongst a plurality of predetermined functioning states.

This module 15 comprises an excitation control unit 16 and a states machine 17 which can command the unit 16.

The states machine 17 stores different functioning states which can be applied to the alternator 1.

These states correspond for example to the:

Stoppage mode, known as the STAND_BY mode, in which the excitation of the rotor is maintained at 0% in cyclical ratio terms;

Timing mode, known as the TIMER mode, in which the excitation is cut off for a predetermined time, for example for 5 seconds during starting;

Pre-excitation mode of the rotor, known as PRE_EXC, during which the cyclical ratio is maintained at approximately 12.5% for example;

Progressive response mode, known as LRC mode, during which the cyclical ratio varies between 0 and 100%;

Normal regulation mode, known as NORMAL mode, during which the cyclical ratio varies according to the battery charge in particular;

Phase regulation mode.

A power stage 21 upstream from the module 15 is connected to the alternator 1, in order to command the latter by supplying the excitation to the rotor of the machine, according to excitation signals supplied by the command module 15.

This power stage 21 comprises a transistor 22 of the MOSFET type, and a free-wheel diode 23.

The regulator 10 is designed to receive and process at least one item of information which is representative of the speed of rotation of the rotor of the rotary electric machine 1.

A phase screw 25 is provided in order to permit mechanical connection and electrical connection between the phases of the stator and the regulator.

The regulator additionally comprises a logic block 30 which can receive at least one item of information SENSE which is representative of a charge level of the battery 2, a reference value Max_SP and an item of information which is representative of a functioning mode of the rotary electric machine, selected from amongst the plurality of functioning modes, and designed to permit comparison of the information SENSE which is representative of a charge level of the battery 2, with the reference value Max_SP, when the rotary electric machine is functioning in the predetermined mode PRE_EXC detected by the logic block 30.

The excitation control unit 16, which is also known as the field controller, is designed to receive an order from the logic block 30 in order to give rise to interruption of excitation which is applied to the rotary electric machine 1, when, further to the aforementioned comparison, the logic block 30 detects an excessive charge level of the battery 2 during the functioning mode PRE_EXC.

The regulator 10 comprises a maximum command detection block 31 of the digital type, which is designed to generate said reference value Max_SP selected as the maximum of an internal command REF_INT and an external command REF_EXT detected by this detection block 31.

The regulator 10 additionally comprises a selector 32, provided for example with a multiplexer, which is designed to select one of the command values REF_INT and REF_EXT, and transmit the value selected to the differential amplifier 11 as being the command REF.

The invention claimed is:

1. A method for protection of an energy storage source (2) of a motor vehicle against possible overloading caused by prolonged application of an electric voltage to said energy storage source, said electric voltage being generated at least partially by a rotary electric machine (1) being an alternator or an alternator-starter, the method comprising the following steps:

measuring of a charge level of said energy storage source, said charge level being represented by a voltage measured at terminals of said energy storage source or a PWM signal, while said rotary electric machine functioning in a predetermined functioning mode and electric excitation applied to said electric machine;

comparing a value (SENSE) of said charge level with a reference value (Max_SP), said reference value (Max_SP) being selected as the larger out of two command values (REF_INT; REF_EXT);

if said value of said charge level measured for said energy storage source is greater than said reference value, interrupting the excitation applied to said rotary electric machine.

2. The method according to claim 1, wherein during said predetermined functioning mode, the excitation which is applied to said rotary electric machine (1) is substantially constant.

3. The method according to claim 2, wherein said predetermined functioning mode corresponds to a pre-excitation mode (PRE_EXC) of said rotary electric machine.

4. The method according to claim 1, wherein the excitation which is applied to said rotary electric machine during said functioning mode corresponds to a cyclical ratio which is selected from between 5% and 20%.

5. The method according to claim 1, wherein the electrical excitation which is applied to said rotary electric machine is supplied by a regulator, and wherein the first one (REF_EXT) of said two command values is supplied externally to said regulator by a system to control a vehicle engine, and is transmitted to said regulator, and the second one (REF_INT) of said command values is generated internally by said regulator.

6. A regulator for a rotary electric machine being an alternator or an alternator-starter, said regulator comprising:

a logic block (30) receiving at least one item of information representative of a charge level of an energy storage source, a reference value and an item of information representative of a functioning mode of said rotary electric machine selected from a plurality of functioning modes, and comparing said information representative of said charge level of said energy storage source, with said reference value, at least when said rotary electric machine is functioning in a predetermined mode detected by said logic block;

a maximum command detection block (31) provided to generate said reference value selected as the maximum of an internal command and an external command detected by said detection block;

a field controller (15) provided to receive an order from said logic block in order to interrupt the excitation applied to said rotary electric machine, when, further to said comparison, said logic block (30) detects an excessive charge level of said energy storage source during said functioning mode.

7. The regulator according to claim 6, further comprising means to receive and process at least one item of information representative of a speed of rotation of a rotor of said rotary electric machine.

8. The regulator according to claim 6, further comprising means to impose on said rotary electric machine, from a plurality of functioning modes, a pre-excitation functioning mode, during which electrical excitation, corresponding to a predetermined cyclical ratio, which is maintained constant during said functioning mode.

9. The regulator according to claim 8, further comprising means permitting the receipt of the information representative of a speed of rotation of a rotor of said rotary electric machine, during said pre-excitation functioning mode of said rotary electric machine.

\* \* \* \* \*